ns373B2

United States Patent
Ramachandra et al.

(10) Patent No.: US 10,178,373 B2
(45) Date of Patent: Jan. 8, 2019

(54) STEREO YAW CORRECTION USING AUTOFOCUS FEEDBACK

(71) Applicant: QUALCOMM Incorporated, San Diego, CA (US)

(72) Inventors: Vikas Ramachandra, San Diego, CA (US); Kalin Mitkov Atanassov, San Diego, CA (US); Ruben Manuel Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/250,798

(22) Filed: Apr. 11, 2014

(65) Prior Publication Data

US 2015/0049172 A1 Feb. 19, 2015

Related U.S. Application Data

(60) Provisional application No. 61/866,950, filed on Aug. 16, 2013.

(51) Int. Cl.
*H04N 13/246* (2018.01)
*G06T 7/80* (2017.01)
*G06T 7/571* (2017.01)
*H04N 13/239* (2018.01)

(52) U.S. Cl.
CPC ........... *H04N 13/246* (2018.05); *G06T 7/571* (2017.01); *G06T 7/85* (2017.01); *H04N 13/239* (2018.05)

(58) Field of Classification Search
CPC ... G06T 7/002; G06T 7/0069; H04N 13/0239; H04N 13/0246
See application file for complete search history.

(56) References Cited

U.S. PATENT DOCUMENTS 3,698,803 A 10/1972 Toshio
4,114,171 A 9/1978 Altman
4,437,745 A 3/1984 Hajnal
(Continued)

FOREIGN PATENT DOCUMENTS

CN 101046534 A 10/2007
CN 101065955 A 10/2007
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

*Primary Examiner* — Maria E Vazquez Colon
(74) *Attorney, Agent, or Firm* — Paradice and Li, LLP

(57) ABSTRACT

Systems and methods for correcting stereo yaw of a stereoscopic image sensor pair using autofocus feedback are disclosed. A stereo depth of an object in an image is estimated from the disparity of the object between the images captured by each sensor of the image sensor pair. An autofocus depth to the object is found from the autofocus lens position. If the difference between the stereo depth and the autofocus depth is non zero, one of the images is warped and the disparity is recalculated until the stereo depth and the autofocus depth to the object is substantially the same.

24 Claims, 8 Drawing Sheets

(56) References Cited

U.S. PATENT DOCUMENTS

| | | |
|---|---|---|
| 4,639,586 A | 1/1987 | Fender et al. |
| 4,740,780 A | 4/1988 | Brown et al. |
| 4,751,570 A | 6/1988 | Robinson |
| 4,890,314 A | 12/1989 | Judd et al. |
| 5,012,273 A | 4/1991 | Nakamura et al. |
| 5,016,109 A | 5/1991 | Gaylord |
| 5,063,441 A | 11/1991 | Lipton et al. |
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,506,913 A | 4/1996 | Ibison et al. |
| 5,539,483 A | 7/1996 | Nalwa |
| 5,606,627 A | 2/1997 | Kuo |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,760,846 A | 6/1998 | Lee |
| 5,793,527 A | 8/1998 | Nalwa |
| 5,798,791 A | 8/1998 | Katayama et al. |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,034 A | 10/2000 | McCutchen |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,421,185 B1 | 7/2002 | Wick et al. |
| 6,445,815 B1 | 9/2002 | Sato |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 | 7/2004 | Bradski et al. |
| 6,775,437 B2 | 8/2004 | Kazarinov et al. |
| 6,782,137 B1 | 8/2004 | Avinash |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 6,862,364 B1 | 3/2005 | Berestov |
| 6,987,534 B1 | 1/2006 | Seta |
| 6,992,700 B1 | 1/2006 | Sato et al. |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 | 10/2006 | Yoshikawa |
| 7,215,479 B1 | 5/2007 | Bakin |
| 7,253,394 B2 | 8/2007 | Kang |
| 7,271,803 B2 | 9/2007 | Ejiri et al. |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson et al. |
| 7,860,214 B1 | 12/2010 | Haff |
| 7,893,957 B2 | 2/2011 | Peters et al. |
| 7,961,398 B2 | 6/2011 | Tocci |
| 7,978,222 B2 | 7/2011 | Schneider |
| 8,004,557 B2 | 8/2011 | Pan |
| 8,098,276 B2 | 1/2012 | Chang et al. |
| 8,115,813 B2 | 2/2012 | Tang |
| 8,139,125 B2 | 3/2012 | Scherling |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 | 1/2013 | Baluja et al. |
| 8,400,555 B1 | 3/2013 | Georgiev et al. |
| 8,442,392 B2 | 5/2013 | Ollila et al. |
| 8,482,813 B2 | 7/2013 | Kawano et al. |
| 8,791,984 B2 | 7/2014 | Jones et al. |
| 8,836,693 B2 | 9/2014 | Katano |
| 8,928,988 B1 | 1/2015 | Ford et al. |
| 8,988,564 B2 | 3/2015 | Webster et al. |
| 9,049,375 B2 | 6/2015 | Wade et al. |
| 9,055,208 B2 | 6/2015 | Kim |
| 9,185,296 B2 | 11/2015 | Wade et al. |
| 9,264,610 B2 | 2/2016 | Duparre |
| 9,294,672 B2 | 3/2016 | Georgiev et al. |
| 9,316,810 B2 | 4/2016 | Mercado |
| 9,332,188 B2 | 5/2016 | Takei et al. |
| 9,602,806 B1 * | 3/2017 | Stafford ............ H04N 13/0059 |
| 9,609,210 B2 | 3/2017 | Djordjevic et al. |
| 9,952,371 B2 | 4/2018 | Ambur et al. |
| 9,973,680 B2 | 5/2018 | Osborne et al. |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0034395 A1 | 2/2003 | Tsikos et al. |
| 2003/0038814 A1 | 2/2003 | Blume |
| 2003/0156751 A1† | 8/2003 | Lee |
| 2003/0214575 A1 | 11/2003 | Yoshikawa |
| 2004/0021767 A1 | 2/2004 | Endo et al. |
| 2004/0051805 A1 | 3/2004 | Yoshikawa et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0195492 A1 | 10/2004 | Hsin |
| 2004/0201769 A1 | 10/2004 | Yoshikawa et al. |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2005/0243175 A1 | 11/2005 | Yamada et al. |
| 2005/0253951 A1 | 11/2005 | Fujimoto et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0061660 A1 | 3/2006 | Brackmann |
| 2006/0084852 A1 | 4/2006 | Mason et al. |
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030573 A1 | 2/2008 | Ritchey |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |

(56) References Cited

U.S. PATENT DOCUMENTS

| | | |
|---|---|---|
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268210 A1 | 10/2009 | Prince |
| 2009/0268983 A1 | 10/2009 | Stone et al. |
| 2009/0268985 A1* | 10/2009 | Wong .................. G06K 9/209 382/299 |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1 | 2/2011 | Wang et al. |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1* | 7/2011 | Barenbrug ............ G06T 15/205 345/419 |
| 2011/0213664 A1 | 9/2011 | Osterhout et al. |
| 2011/0235899 A1 | 9/2011 | Tanaka |
| 2011/0249341 A1 | 10/2011 | DiFrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0127276 A1† | 5/2012 | Tsai |
| 2012/0229688 A1 | 9/2012 | Tajiri |
| 2012/0249536 A1 | 10/2012 | Sutou |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1* | 12/2012 | Cheng ................ H04N 5/23212 348/47 |
| 2013/0003140 A1 | 1/2013 | Keniston et al. |
| 2013/0010084 A1 | 1/2013 | Hatano |
| 2013/0038689 A1 | 2/2013 | McDowall |
| 2013/0057655 A1† | 3/2013 | Su |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1* | 9/2013 | Levy .................... H04N 13/026 348/43 |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0329015 A1* | 12/2013 | Pulli .................. H04N 13/0253 348/47 |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2014/0340568 A1 | 11/2014 | Sano et al. |
| 2015/0043076 A1 | 2/2015 | Nakayama |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |
| 2015/0373252 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0353008 A1 | 12/2016 | Osborne |
| 2016/0373263 A1 | 12/2016 | Zaidi et al. |
| 2017/0026570 A1 | 1/2017 | Shepard et al. |
| 2017/0038502 A1 | 2/2017 | Georgiev |
| 2017/0118421 A1 | 4/2017 | Georgiev |
| 2018/0084193 A1 | 3/2018 | Georgiev et al. |

FOREIGN PATENT DOCUMENTS

| | | |
|---|---|---|
| CN | 101201459 A | 6/2008 |
| CN | 101257576 A | 9/2008 |
| CN | 101571666 A | 11/2009 |
| CN | 101581828 A | 11/2009 |
| CN | 101867720 A | 10/2010 |
| CN | 101902657 A | 12/2010 |
| CN | 101926171 A | 12/2010 |
| CN | 101952762 A | 1/2011 |
| CN | 201917706 U | 8/2011 |
| CN | 202405984 U | 8/2012 |
| CN | 103038689 A | 4/2013 |
| CN | 103376613 A | 10/2013 |
| CN | 203519911 U | 4/2014 |
| CN | 203519914 U | 4/2014 |

(56) References Cited

FOREIGN PATENT DOCUMENTS

| | | |
|---|---|---|
| CN | 203551875 U | 4/2014 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | S60213178 A | 10/1985 |
| JP | H06217184 A | 8/1994 |
| JP | H06251127 A | 9/1994 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | H0946729 A | 2/1997 |
| JP | H09214992 A | 8/1997 |
| JP | H10142490 A | 5/1998 |
| JP | 2001194114 A | 7/2001 |
| JP | 2002158913 A | 5/2002 |
| JP | 2003304561 A | 10/2003 |
| JP | 2004260787 A | 9/2004 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| JP | 2012085102 A | 4/2012 |
| JP | 2013117568 A | 6/2013 |
| KR | 20060049992 A | 5/2006 |
| KR | 20080071400 A | 8/2008 |
| WO | WO-199321560 A1 | 10/1993 |
| WO | WO-199847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | 2011108276 A1 | 9/2011 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

International Search Report and Written Opinion—PCT/US2014/049776—ISA/EPO—dated Nov. 14, 2014.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, in Depth Look," IEEE Potentials, Feb./Mar. 2004, vol. 23, Issue 1, pp. 38-42.

Sun W.S., et al., "Single-Lens Camera Based on a Pyramid Prism Array to Capture Four Images," Optical Review, 2013, vol. 20 (2), pp. 145-152.

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Ricoh Imagine Change: "New Ricoh Theta Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.

Meng et al., "Single-shot Specular Surface Reconstruction with Gonio-plenoptic Imaging," 2015 IEEE International Conference on Computer Vision; pp. 3433-3441.

Chowdhury A., et al., "Challenges of Megapixel Camera Module Assembly and Test," Electronic Components and Technology Conference, 2005, pp. 1390-1401.

Hung K-Y., et al., "Integrated the Back-Side Inclined Exposure Technology to Fabricate the 45 Degree K-Type Prism with Nanometer Roughness," NEMS 2012, Kyoto, Japan, Mar. 2012, pp. 120-124.

Wenyi Zhao and N. Nandhakumar, "Effects of Camera Alignment Errors on Stereoscopic Depth Estimates", 24 pages, Dec. 1996, Pattern Recognition.†

* cited by examiner
† cited by third party

STEREO YAW CORRECTION USING AUTOFOCUS FEEDBACK

RELATED APPLICATIONS

This application claims the benefit of U.S. Provisional Patent Application No. 61/866,950, filed Aug. 16, 2013, titled "STEREO YAW CORRECTION USING AUTOFOCUS FEEDBACK," the disclosure of which is hereby incorporated herein by reference in its entirety and for all purposes.

BACKGROUND

Technical Field

The present embodiments relate to imaging devices, and in particular, to systems, methods, and apparatus to correct for misalignment of stereoscopic image sensors.

Background

Digital imaging capabilities are currently being integrated into a wide range of devices, including digital cameras and mobile phones. Such devices may include the functionality to capture stereoscopic "3D" images. Device manufacturers have responded to the consumer by introducing devices integrating digital image processing to support capturing stereoscopic images utilizing single or multiple digital imaging sensors. A wide range of electronic devices, including mobile wireless communication devices, personal digital assistants (PDAs), personal music systems, digital cameras, digital recording devices, video conferencing systems, and the like, may make use of stereoscopic imaging capabilities to provide a variety of capabilities and features to their users. These include stereoscopic imaging applications such as 3D photos and videos.

To make stereoscopic data playback comfortable for viewers, it is desirable to provide digital systems wherein the imaging sensors are perfectly aligned, or nearly so. This allows the individual images captured by each imaging sensor to be more perfectly aligned to provide a stereoscopic image that reduces eye strain and other issues with viewing such images. However, this "perfect" image alignment of stereoscopic image pairs may drift over time due to gravity, heat, mechanical assembly, and in-use wear and tear. These sensor alignment imperfections, when present, can lead to capture of unaligned images which may result in visual discomfort to the viewer unless otherwise corrected. In some cases, a drift in yaw causes depth measurement errors. In other cases, autofocus accuracy starts to drift with age. In both cases, correction of the misalignment is desired to provide accurate depth measurements and improved stereoscopic image quality.

SUMMARY

The systems, methods and devices of the disclosure each have several innovative aspects, no single one of which is solely responsible for the desirable attributes disclosed herein. Combinations of the innovations, aspects and features described herein can be incorporated in various embodiments of systems, methods, and devices, and such combinations are not limited by the examples of embodiments described herein.

Some of the embodiments may include a system for performing yaw correction of a stereoscopic image sensor pair includes an imaging device comprising a pair of stereoscopic image sensors and a control module. The control module may be configured to capture one or more images of an object with the sensor pair, determine a disparity of the object from the one or more images, estimate the stereoscopic depth of the object from the one or more images, set an autofocus lens position of the stereoscopic image sensor pair, perform autofocus functions on the object to determine a high frequency autofocus position, estimate the autofocus depth from the high frequency autofocus position, and estimate and correct a yaw angle correction using the difference between the autofocus depth and the stereoscopic depth.

Some embodiments may include a method for yaw correction of a stereoscopic image sensor pair using autofocus feedback. In one aspect, the method may include the steps of providing a stereoscopic image sensor pair and capturing one or more images of an object with the sensor pair. This method further includes determining a disparity of the object from the one or more images, estimating the stereoscopic depth of the object from the one or more images, setting an autofocus lens position of the stereoscopic image sensor pair, performing autofocus functions on the object to determine a high frequency autofocus position, estimating the autofocus depth from the high frequency autofocus position, and estimating and correcting a yaw angle correction using the difference between the autofocus depth and the stereoscopic depth.

In another embodiment, a method for autofocus lens position correction of a stereoscopic image sensor pair using autofocus feedback may include the steps of providing a stereoscopic image sensor pair, capturing one or more images of an object with the sensor pair, determining a disparity of the object from the one or more images, estimating the stereoscopic depth of the object from the one or more images, setting an autofocus lens position of the stereoscopic image sensor pair, performing autofocus functions on the object to determine a high frequency autofocus position, estimating the autofocus depth from the high frequency autofocus position, and correcting an autofocus lens position using the difference between the autofocus depth and the stereoscopic depth.

One aspect relates to a system for digitally correcting a physical misalignment of a pair of imaging sensors, including an imaging device comprising a first imaging sensor and a second imaging sensor and a control module. The control module may be configured to capture a first image data of an object with the first imaging sensor, capture a second image data of an object with the second imaging sensor, estimate a first depth of the object using the first image data and the second image data, estimate a second depth of the object from an autofocus lens position of the imaging device, compare the first depth and the second depth, and estimate and correct the misalignment between the first imaging sensor and the second imaging sensor using the difference between the first depth and the second depth. The control module may be further configured to determine a disparity of the object by comparing the first image data and the second image data. In some aspects, estimating the first depth of the object using the first image data and the second image date includes determining a stereoscopic depth estimate by comparing keypoints of the object located in both the first image data and the second image data. In some aspects, the control module may be further configured to perform autofocus functions while the imaging device is focused on the object to determine and set the autofocus lens position of the first imaging sensor and the second imaging sensor. In some aspects, estimating the second depth of the object from an autofocus lens position of the imaging device includes determining a focus position of the first imaging sensor and the second imaging sensor using a high frequency map to set the autofocus lens position of the first imaging sensor and the second imaging sensor and estimating an autofocus depth from the autofocus lens position. In some aspects, the control module may be further configured to warp one of the first image data and the second image data to reduce the disparity of the object if the difference between the first depth and the second depth is not zero.

In another aspect, a method for digitally correcting a physical misalignment of a pair of imaging sensors using autofocus feedback includes the steps of capturing a first image data of an object with a first imaging sensor, capturing a second image data of the object with a second imaging sensor, estimating a stereoscopic depth of the object using the first image data and the second image data, estimating an autofocus depth of the object from an autofocus lens position of the imaging device, comparing the stereoscopic depth and the autofocus depth, and estimating and correcting a misalignment between the first imaging sensor and the second imaging sensor using the difference between the stereoscopic depth and the autofocus depth. In some aspects, the method further includes determining a disparity of the object by comparing the first image data and the second image data. In some aspects, estimating the stereoscopic depth of the object using the first image data and the second image date includes comparing keypoints of the object located in both the first image data and the second image data. In some aspects, the method further includes performing autofocus functions while the imaging device is focused on the object to determine and set the autofocus lens position of the first imaging sensor and the second imaging sensor. In some aspects, estimating the autofocus depth of the object from an autofocus lens position of the imaging device includes determining a focus position of the first imaging sensor and the second imaging sensor using a high frequency map to set the autofocus lens position of the first imaging sensor and the second imaging sensor and estimating the autofocus depth from the autofocus lens position. In some aspects, the method further includes warping one of the first image data and the second image data to reduce the disparity of the object if the difference between the stereoscopic depth and the autofocus depth is not zero.

In yet another aspect, a method for correcting an autofocus lens position of an imaging device having a first imaging sensor and a second imaging sensor using autofocus feedback includes the steps of capturing a first image data of an object with the first imaging sensor, capturing a second image data of the object with the second imaging sensor, estimating a stereoscopic depth of the object using the first image data and the second image data, estimating an autofocus depth of the object from an autofocus lens position of the imaging device, comparing the stereoscopic depth and the autofocus depth, and correcting an autofocus lens position of the imaging device using the difference between the autofocus depth and the stereoscopic depth. In some aspects, estimating a stereoscopic depth of the object further includes determining a disparity of the object from the first image data and the second image data. In some aspects, estimating an autofocus depth of the object from an autofocus lens position further includes performing autofocus functions on the object to determine and set the autofocus lens position of the first imaging sensor and the second imaging sensor. In some aspects, setting the autofocus lens position further includes determining a focus position of the first imaging sensor and the second imaging sensor using a high frequency map. In some aspects, correcting an autofocus lens position of the imaging device further includes correcting a distance estimate of the autofocus lens position if the difference between the autofocus depth and the stereoscopic depth is not zero.

In some aspects, an apparatus for digitally correcting a physical misalignment of a pair of imaging sensors using autofocus feedback, includes means for capturing a first image data of an object with a first imaging sensor, means for capturing a second image data of the object with a second imaging sensor, means for estimating a stereoscopic depth of the object using the first image data and the second image data by comparing keypoints of the object located in both the first image data and the second image data, means for estimating an autofocus depth of the object from an autofocus lens position of the imaging device by determining a focus position of the first imaging sensor and the second imaging sensor using a high frequency map to set the autofocus lens position of the first imaging sensor and the second imaging sensor and estimating the autofocus depth from the autofocus lens position, means for comparing the stereoscopic depth and the autofocus depth, and means for estimating and correct a misalignment between the first imaging sensor and the second imaging sensor using the difference between the stereoscopic depth and the autofocus depth.

In another aspect, an apparatus for correcting an autofocus lens position of an imaging device and correcting a physical misalignment of a pair of imaging sensors using autofocus feedback includes means for capturing a first image data of an object with a first imaging sensor, means for capturing a second image data of the object with a second imaging sensor, means for estimating a stereoscopic depth of the object using the first image data and the second image data by determining a disparity of the object from the first image data and the second image data, means for estimating an autofocus depth of the object from an autofocus lens position of the imaging device by performing autofocus functions on the object to determine and set the autofocus lens position of the first imaging sensor and the second imaging sensor using a high frequency map, means for comparing the stereoscopic depth and the autofocus depth, and means for correcting an autofocus lens position of the imaging device using the difference between the autofocus depth and the stereoscopic depth by correcting a distance estimate of the autofocus lens position if the difference between the autofocus depth and the stereoscopic depth is not zero. In some aspects, the apparatus further includes means for determining a disparity of the object by comparing the first image data and the second image data. In some aspects, the apparatus further includes means for performing autofocus functions while the imaging device is focused on the object to determine and set the autofocus lens position of the first imaging sensor and the second imaging sensor. In some aspects, the apparatus further includes means for warping one of the first image data and the second image data to reduce the disparity of the object if the difference between the stereoscopic depth and the autofocus depth is not zero. In some aspects, the apparatus further includes means for estimating and correcting a misalignment between the first imaging sensor and the second imaging sensor using the difference between the stereoscopic depth and the autofocus depth.

In yet another aspect, a non-transitory computer-readable medium stores instructions that, when executed, cause at least one physical computer processor to perform a method of digitally correcting a physical misalignment of a pair of imaging sensors using autofocus feedback. The method includes the steps of capturing a first image data of an object with a first imaging sensor, capturing a second image data of the object with a second imaging sensor, estimating a stereoscopic depth of the object using the first image data and the second image data, estimating an autofocus depth of the object from an autofocus lens position of the imaging device, comparing the stereoscopic depth and the autofocus depth, and estimating and correct a misalignment between the first imaging sensor and the second imaging sensor using the difference between the stereoscopic depth and the autofocus depth. In some aspects, the method further includes determining a disparity of the object by comparing the first image data and the second image data. In some aspects, estimating the stereoscopic depth of the object using the first image data and the second image date includes comparing keypoints of the object located in both the first image data and the second image data. In some aspect, the method further includes performing autofocus functions while the imaging device is focused on the object to determine and set the autofocus lens position of the first imaging sensor and the second imaging sensor. In some aspects, estimating the autofocus depth of the object from an autofocus lens position of the imaging device includes determining a focus position of the first imaging sensor and the second imaging sensor using a high frequency map to set the autofocus lens position of the first imaging sensor and the second imaging sensor and estimating the autofocus depth from the autofocus lens position. In some aspects, the method further includes warping one of the first image data and the second image data to reduce the disparity of the object if the difference between the stereoscopic depth and the autofocus depth is not zero.

In yet another aspect, a non-transitory computer-readable medium stores instructions that, when executed, cause at least one physical computer processor to perform a method of correcting an autofocus lens position of an imaging device having a first imaging sensor and a second imaging sensor using autofocus feedback. The method includes the steps of capturing a first image data of an object with the first imaging sensor, capturing a second image data of the object with the second imaging sensor, estimating a stereoscopic depth of the object using the first image data and the second image data, estimating an autofocus depth of the object from an autofocus lens position of the imaging device, comparing the stereoscopic depth and the autofocus depth, and correcting an autofocus lens position of the imaging device using the difference between the autofocus depth and the stereoscopic depth. In some aspects, estimating a stereoscopic depth of the object further includes determining a disparity of the object from the first image data and the second image data. In some aspects, estimating an autofocus depth of the object from an autofocus lens position further includes performing autofocus functions on the object to determine and set the autofocus lens position of the first imaging sensor and the second imaging sensor. In some aspects, setting the autofocus lens position further includes determining a focus position of the first imaging sensor and the second imaging sensor using a high frequency map. In some aspects, correcting an autofocus lens position of the imaging device further includes correcting a distance estimate of the autofocus lens position if the difference between the autofocus depth and the stereoscopic depth is not zero.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DESCRIPTION OF CERTAIN INVENTIVE ASPECTS

Figure 1A:
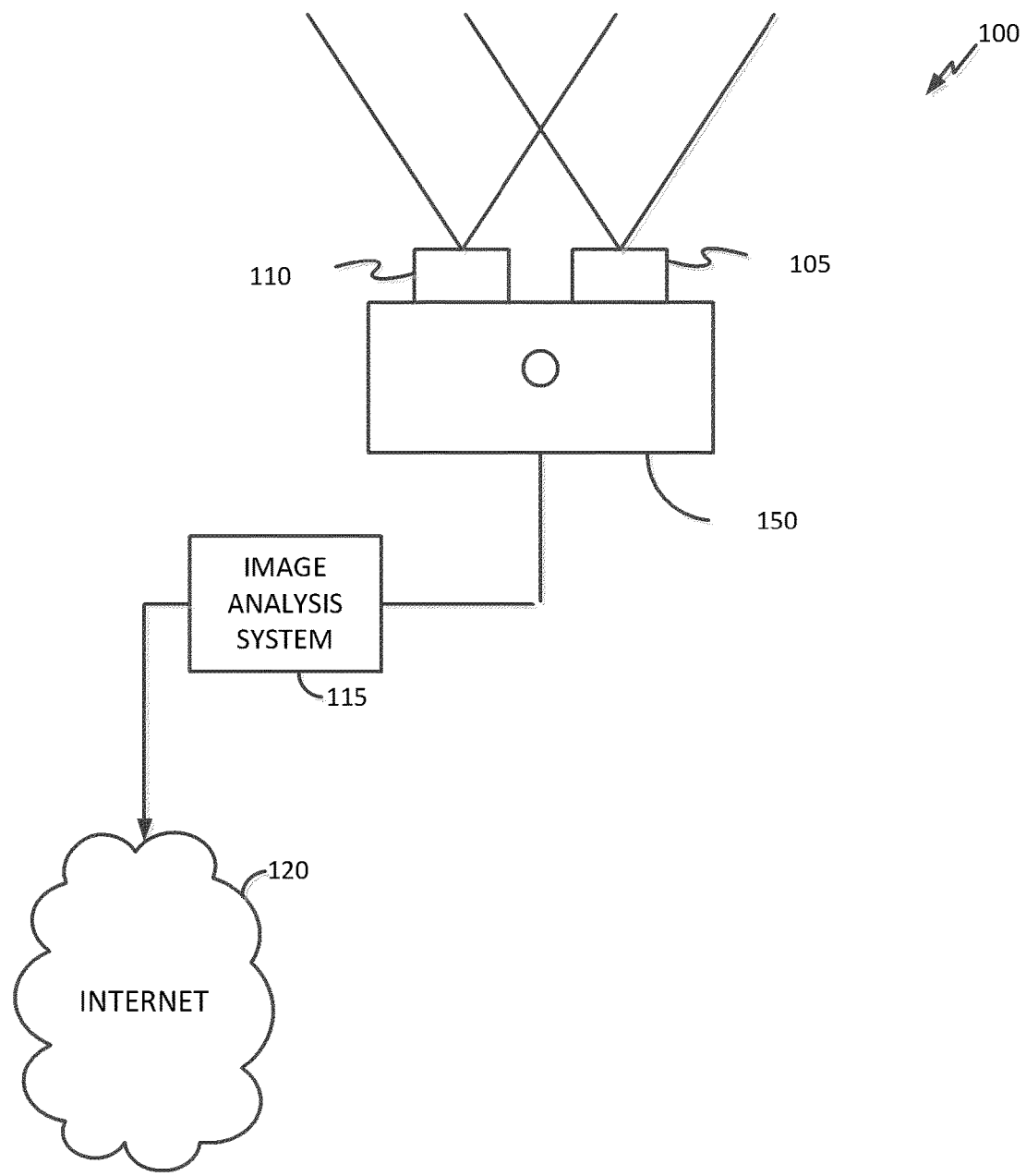
FIG. 1A illustrates a schematic of a stereoscopic imaging system and apparatus.

Certain visual experiments indicate that in order to see a three-dimensional (3D) presentation based on stereoscopic imagery (sometimes referred to herein as "stereo images," "stereoscopic images" or "stereoscopic image pairs") with minimal discomfort or strain, the "left" and "right" digital sensors that are used to capture the stereo images should be properly aligned with one another. For example, the optical (or sensing) axis of the two digital sensors may be optically aligned to be parallel, or substantially parallel, e.g., they differ only by known or easily determined horizontal or vertical shifts which are more easily corrected by digital editing of the captured image. For desirable stereoscopic effects and fusibility of images, a horizontal distance between imaging sensors in a stereoscopic sensor pair is, in some examples, around 3.25 cm. In addition, there is preferably only a relatively small horizontal or vertical shift between the sensors in the pair. However, in actual practice, obtaining aligned parallel imaging sensors is often unachievable due to mechanical mounting limitations, alignment measuring devices, gravity and/or heat effects on the sensors. Thus, certain embodiments described herein provide systems and methods for correcting depth measurement errors of stereoscopic imaging sensors due primarily to sensor drift in the yaw direction.

Calibration of stereoscopic images through digital image processing may be required to align the pairs of images after they have been captured. Some methods may digitally process the stereoscopic image pairs to produce aligned images. Aligning stereoscopic images may include, for example, cropping one or both images to correct for horizontal (x axis) or vertical (y axis) shift between the images of a stereoscopic image pair. The two images of a stereoscopic image pair may also be misaligned about a "z" axis, caused when one imaging sensor is slightly closer to a scene being imaged than the other imaging sensor. Cropping may also be required to correct for misalignment due to rotation of the images about an x, y, or z axis. Finally, cropping may also be required to adjust the convergence point of the two images in the stereoscopic image pair.

In addition to the two dimensional x, y and z offsets discussed above, the relative positions of a pair of imaging sensors can also be described by measuring three axes of angular movement and three axes of shift. For purposes of this disclosure, positions on an x, y, and z axis describe relative shift. Angular rotation can be described by rotations about a horizontal (x) axis, also called "pitch," vertical (y) axis, known as "roll," and (z) axis or "yaw."

Some configurations of stereoscopic cameras may have asymmetric sensors wherein one sensor is a low resolution image sensor and the other sensor is a high resolution image sensor. During manufacture, the sensors are calibrated such that the sensor images are parallel. However, for some configurations, such as cameras with high quality autofocus systems, the camera lens positions slowly drift due to gravity, heat, mechanical assembly issues, or wear and tear. Lens position drift in the yaw position in particular can cause depth measurement errors. In some configurations, estimation of the yaw angle difference between the two imaging sensors may be used to correct the depth measurements.

For other configurations, such as cameras with low quality autofocus system, the autofocus accuracy can drift over time due to wear and tear of the components or aging materials used to form the components. In some configurations, a distance or depth measurement of objects in a scene that is estimated using stereo imaging sensors is better than an autofocus depth estimate determined by using the autofocus system in the device. Therefore, in some configurations, the depth estimated using the stereo imaging sensors may be used to correct the autofocus lens position. Special charts or targets may not be needed to correct the depth error measurement and adjust the autofocus lens position of the imaging sensors. In many cases, no user input is needed to perform the correction. Furthermore, image processing of the stereo images such as keypoint detection and matching may not be needed in some embodiments. Additionally, since the autofocus search space is generally small and the yaw drift is generally small, the processes described below are quick and work in real time.

System Overview

FIG. 1A illustrates a schematic of an embodiment of a system 100 that may be used to correct a depth error measurement performed by an imaging device 150. The illustrated system 100 includes an imaging device 150 that includes two imaging sensors 105 and 110. The two imagine sensors 110 and 105 may be referred to herein as a "pair" of sensors, or a "left" and "right" sensor. The imaging sensors 105 and 110 may be any type of sensor that can capture light and convert the light into electrical signals. In some configurations, the imaging sensors 105 and 110 may be charge-coupled devices (CCD) or CMOS sensors. In the embodiment illustrated, the imaging sensors 105 and 110 are as mounted adjacent one another on the imaging device 150 such that they can capture a stereoscopic image of an object (or scene). The imaging sensors 110 and 105 may be configured to capture images of the same resolution, or different resolutions.

FIG. 1A also illustrates an image analysis system 115 coupled to the imaging device 150 and in data communication with the imaging device 150. One example of an image analysis system 115 is further described with reference to FIG. 2. In some implementations, the image analysis system 115 may be housed together with the imaging device 150, while in others the imaging device 150 and the image analysis system 115 are housed separately. For example, the image analysis system 115 may be incorporated into the imaging device 150 or may be a separate system. The image analysis system 115 may be configured, and be operable to, determine the relative positions of the imaging sensors 105 and 110 mounted on the imaging device 150 and determine and/or provide image correction information, for example, depth measurement error corrections and correction of horizontal and vertical disparities caused by disparity drift of the imaging sensors 105 and 110 due to yaw. In some embodiments, the image analysis system is coupled to the imaging device for communicating information between the image analysis system and the imaging device. The coupling may be, for example, via a wired or wireless connection.

Figure 1B:
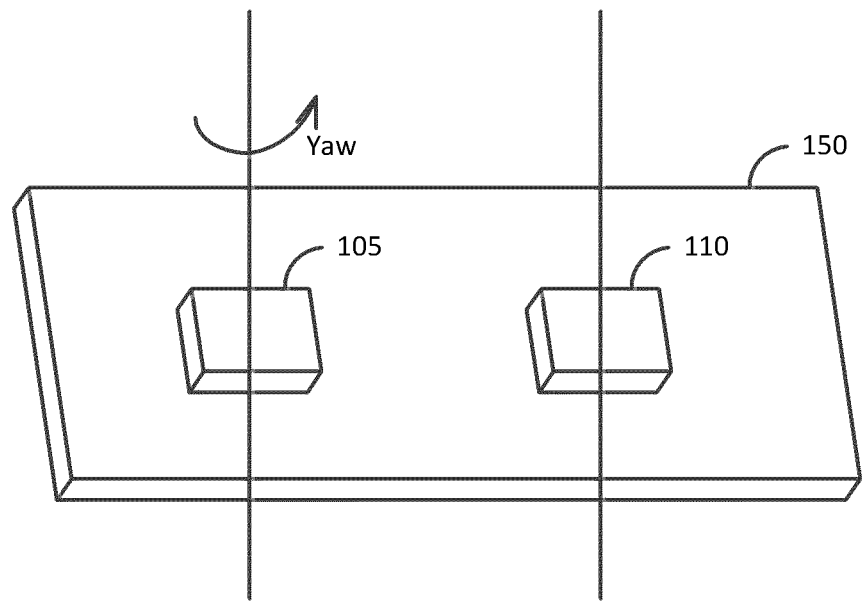
FIG. 1B illustrates a schematic of an imaging sensor pair mounted as part of an imaging device.
Figure 1C:
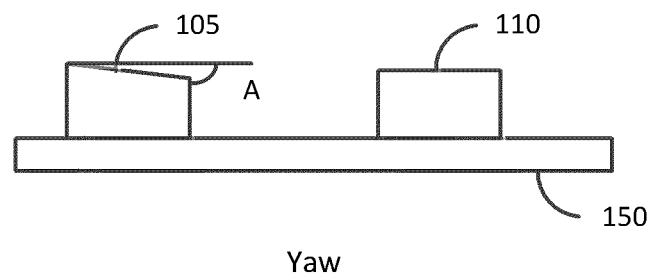
FIG. 1C illustrates a schematic of an imaging sensor pair in which one imaging sensor has rotated about the yaw axis such by an angle A.

FIGS. 1B and 1C illustrate the imaging sensors 105 and 110 mounted as part of the imaging device 150. FIG. 1B illustrates a yaw angle rotation of the sensor 105 about a yaw axis. FIG. 1C illustrates the imaging sensor 105 that has experienced yaw angle drift (as indicated by angle A) and is therefore facing in a slightly different direction than the imaging sensor 110. Angle A illustrates a yaw angle disparity between the imaging sensor 110 and the imaging sensor 105. FIGS. 1B and 1C illustrate a set of imaging sensors 105 and 110 placed side by side. However, the imaging sensors 105 and 110 may be in any orientation, including side to side, top to bottom, or diagonal. Additionally, one imaging sensor 105 is shown to have a yaw disparity from the imaging sensor 110 as indicated by angle A. In other embodiments, imaging sensor 110 may have a yaw disparity from the imaging sensor 105.

Figure 2:
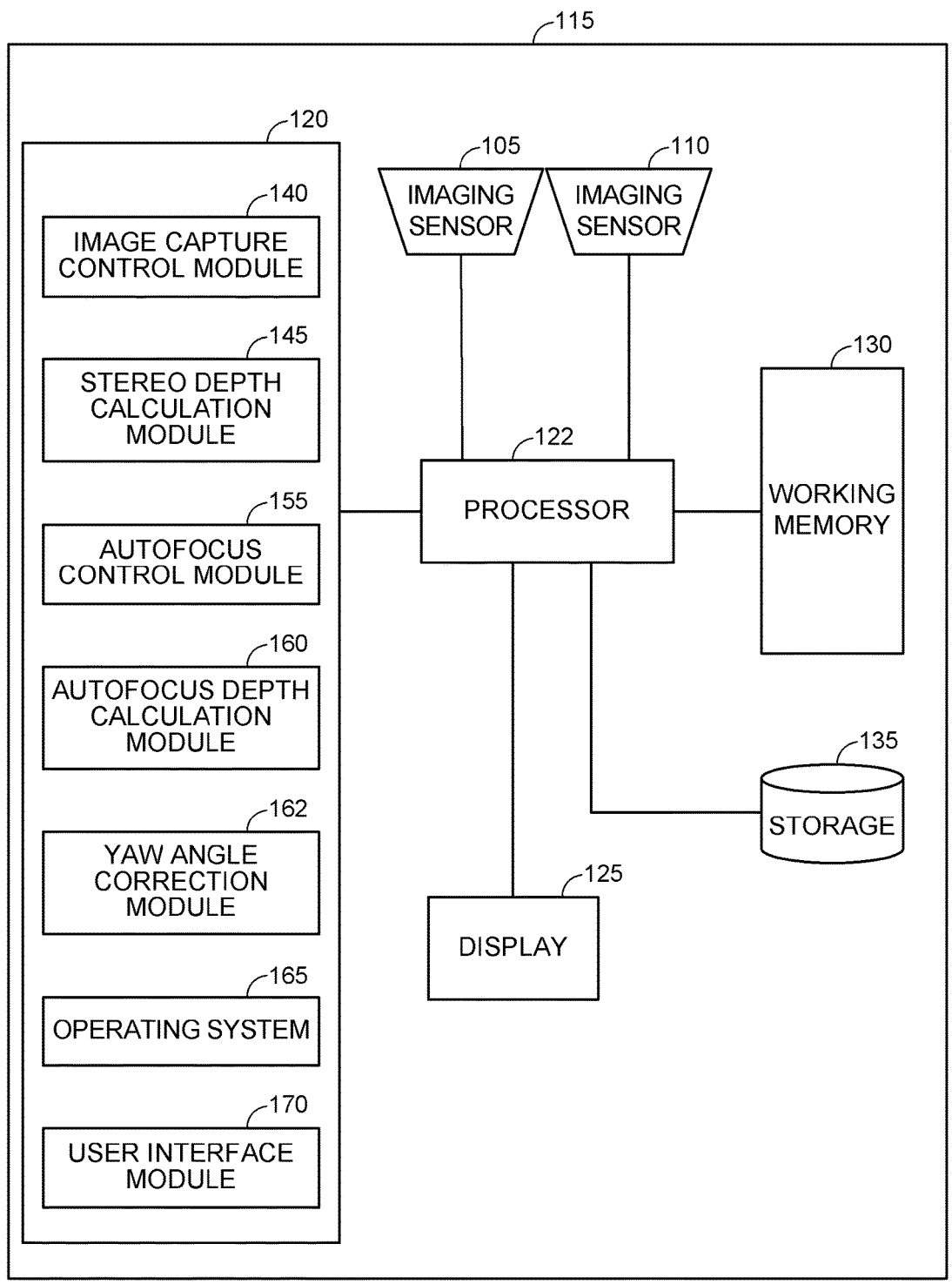
FIG. 2 is a block diagram depicting a system implementing some operative elements of digital correction of yaw misalignment of imaging sensors.

FIG. 2 illustrates a block diagram of one embodiment of an image analysis system 115 having a set of components including a processor 122 in communication with imaging sensors 105 and 110. The image analysis system 115 may include additional components, for example, that are not shown in FIG. 2 for clarity of the illustrated components. The image analysis system 115 also includes a working memory 130, storage 135, electronic display 125, and memory 120 that are also in communication with processor 122.

Image analysis system 115 may be a stationary device such as a desktop personal computer or it may be a mobile device. A plurality of applications may be available to the user on image analysis system 115. These applications may include traditional photographic applications, high dynamic range imaging, panoramic video, or stereoscopic imaging such as 3D images or 3D video.

Processor 122 may be a general purpose processing unit or a processor specially designed for imaging applications. As shown, the processor 122 is connected to a memory 120 and a working memory 130. In the illustrated embodiment, the memory 120 stores several modules, including an image capture control module 140, a stereo depth calculation module 145, an autofocus control module 155, an autofocus depth calculation module 160, a yaw angle correction module 162, operating system 165, and user interface module 170. These modules may include instructions that configure the processor 122 to perform various image processing and device management tasks. Working memory 130 may be used by processor 122 to store a working set of processor instructions contained in the modules of memory 120. Alternatively, working memory 130 may also be used by processor 122 to store dynamic data created during the operation of image analysis system 115.

Still referring to FIG. 2, as mentioned above, the processor 122 may be configured by several modules stored in the memory 120. Image capture control module 140 may include instructions that configure the processor 122 to control imaging sensors 105 and 110 to capture images of a scene. Therefore, processor 122, along with image capture control module 140, imaging sensors 105 or 110, and working memory 130, represent one means for capturing one or more images of an object with a pair of stereoscopic image sensors. The stereo depth calculation module 145 provides instructions that configure the processor 122 to determine a disparity of an object within two or more of captured images of the object and estimate the stereo or stereoscopic depth of the object, defined as the distance of the object from the sensors as determined geometrically from the image data acquired by the pair of image sensors 105, 110. Therefore, processor 122, along with stereo depth calculation module 145 and working memory 130, represent one example of an embodiment of means for estimating the stereoscopic depth of an object from one or more images acquired by a stereoscopic image sensor pair 105 and 110.

The autofocus control module 155 provides instructions that configure the processor 122 to perform an autofocus function using the image sensors 105, 110 to, for example, search for the best high frequency map of the image scene. The autofocus depth calculation module 160 provides instructions that configure the process 122 to calculate a depth of an object in a scene based on one or more characteristics of an autofocus system, for example, the positions of each of the image sensors 105, 110 when the object is determined to be in focus using autofocus functionality. For example, based on the autofocus position of the image sensors 105, 110 during the autofocus function, an equivalent "true" depth or equivalent estimated depth of an object in a scene may be determined. The autofocus characteristic may be, for example, a physical or optical position of one or more components of each of, or one of, the imaging sensors 105, 110 positioned during autofocus operation. The autofocus position may be based on, for example, determining a position of the imaging sensors 105 and 110 to focus on the object using high frequency information (for example, noise) of the object or the scene. Therefore, processor 122, along with autofocus control module 155, autofocus depth calculation module 160, and working memory 130 represent one example of an embodiment of means for performing an autofocus function on the object to determine an autofocus characteristic (for example, position of the imaging sensors) and estimating an autofocus depth of an object from the high frequency autofocus position.

The yaw angle correction module 162 provides instructions that configure the processor 122 to calculate a difference between the depth as measured by the autofocus function and the "depth" of an object in a scene based on the disparity of an object as indicated by the stereoscopic images acquired by the stereoscopic imaging sensors 105 and 110. This difference may used by the yaw angle correction module 162 to estimate and correct the yaw angle of the stereoscopic imaging sensors 105 and 110. Therefore, processor 122, along with yaw angle correction module 162 and working memory 130 represent one example of an embodiment of means for estimating and correcting a yaw angle correction using the difference between the autofocus depth and the stereoscopic depth.

User interface module 170 can include instructions that configure the processor 122 to display information on an electronic display accessible to the user while running the image analysis system 115. Operating system module 165 may configure the processor 122 to manage the memory and processing resources of system 115. For example, operating system module 165 may include device drivers to manage hardware resources such as the electronic display 125 or imaging sensors 105 and 110. In some embodiments, instructions contained in the image processing modules discussed above may not interact with these hardware resources directly, but instead may interact through standard subroutines or APIs located in operating system component 165. Instructions within operating system 165 may then interact directly with these hardware components.

Processor 122 may write data to storage module 130. While storage module 130 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 2 depicts an example embodiment of a device having separate components to include a processor, two imaging sensors, electronic display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, including memory component 120 comprising several modules and a separate memory 130 comprising a working memory, one with skill in the art would recognize several embodiments utilizing different memory architectures may be implemented in various embodiments. For example, a design may utilize ROM or static RAM memory for the storage of processor instructions implementing the modules contained in memory 120. In some embodiments, processor instructions may be read at system startup from a disk storage device that is integrated into image analysis system 115 or connected via an external device port. The processor instructions may then be loaded into RAM to facilitate execution by the processor. For example, working memory 130 may be a RAM memory, with instructions loaded into working memory 130 before execution by the processor 122.

Method Overview

Embodiments of the invention relate to methods for correcting depth measurement disparity due to misalignment of stereoscopic imaging sensors, for example, imaging sensors 105 and 110, as described above with reference to FIGS. 1B and 1C. Two embodiments of methods incorporating autofocus feedback are discussed below. Selection of a method may be influenced by the quality of the autofocus system of the electronic device. For example, for devices with a high quality autofocus system, lens positions of the imaging device 150 can drift slowly due to gravity and heat effects, as well as mechanical assembly inaccuracies and in-use wear and tear. The yaw angle can therefore be estimated using the high quality autofocus system. In another example, for devices with low quality autofocus systems, the autofocus accuracy of the device may start to drift with age. The depth estimated using stereo imaging is therefore likely better than the autofocus depth estimate and thus, the stereo imaging depth can be used to correct the autofocus lens position of the imaging device 150.

Figure 3:
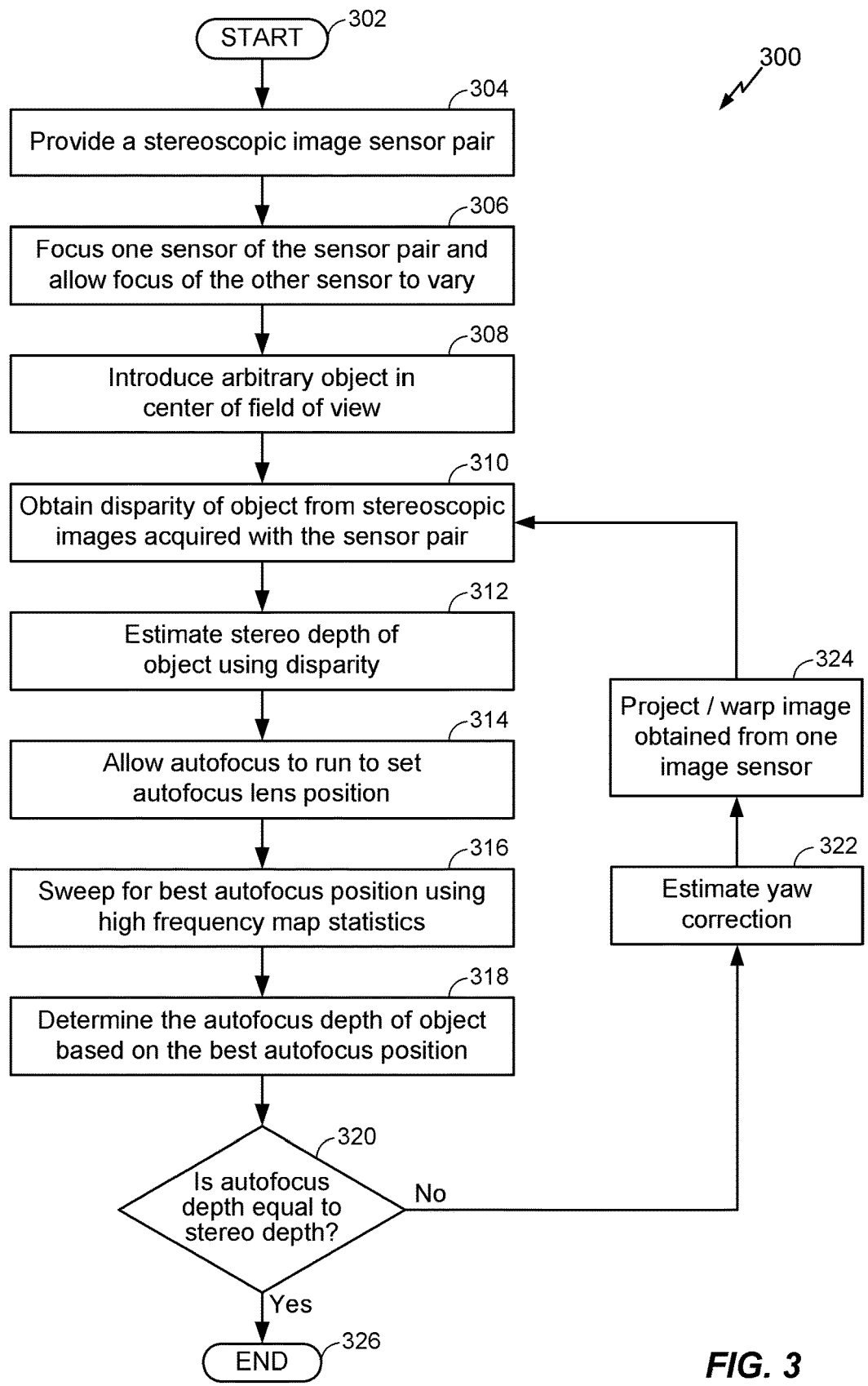
FIG. 3 is a flow chart depicting a high-level overview of a process to correct yaw misalignment of imaging sensors according to one embodiment.

FIG. 3 illustrates one embodiment of a process 300 to correct stereo yaw that may be implemented in several modules depicted in FIG. 2. Various embodiments may include additional actions not depicted in FIG. 3, and/or just some of actions illustrated in FIG. 3. Process 300 may be used in some embodiments to estimate and correct a yaw angle alignment of a stereoscopic image pair for a device having a high quality autofocus system. In some examples, the process 300 may be run on a processor, for example, processor 122 (FIG. 2), and on other components illustrated in FIG. 2 that are stored in memory 120 or that are incorporated in other hardware or software. The process 300 begins at start block 302 and transitions to block 304 wherein a stereoscopic image sensor pair is provided. The image sensor pair may be provided, for example, in a camera, incorporated in a handheld communication device, e.g., a cellular phone or "smartphone," or a mobile personal data assistant (PDA) including a tablet computer.

The process 300 then transitions to block 306 wherein the focus of one imaging sensor is fixed (such as imaging sensor 105 shown in FIG. 2) and the other imaging sensor focus is allowed to vary as needed (such as imaging sensor 110 shown in FIG. 2). However, in other embodiments, the focus of imaging sensor 110 may be fixed and the focus of the other imaging sensor 105 may vary as needed. The focus of either imaging sensor 105 or 110 could be fixed or moving. The process 300 then transitions to block 308, wherein an object is introduced in the center of the field of view of the imaging sensors 105, 110 with center focus enabled. The process 300 next transitions to block 310, wherein the disparity of the object is found from the image data acquired by the imaging sensors 105, 110. In some embodiments, the disparity may be found by determining one or more keypoints of the object and matching the keypoint locations in the images acquired by each sensor of the imaging sensor pair. Keypoints may be distinctive regions of an object that exhibit particularly unique characteristics. For example, regions that exhibit particular patterns or edges may be defined as keypoints. A keypoint match may include a pair of points, with one point identified in the first image and the second point identified in the second image.

Figure 4:
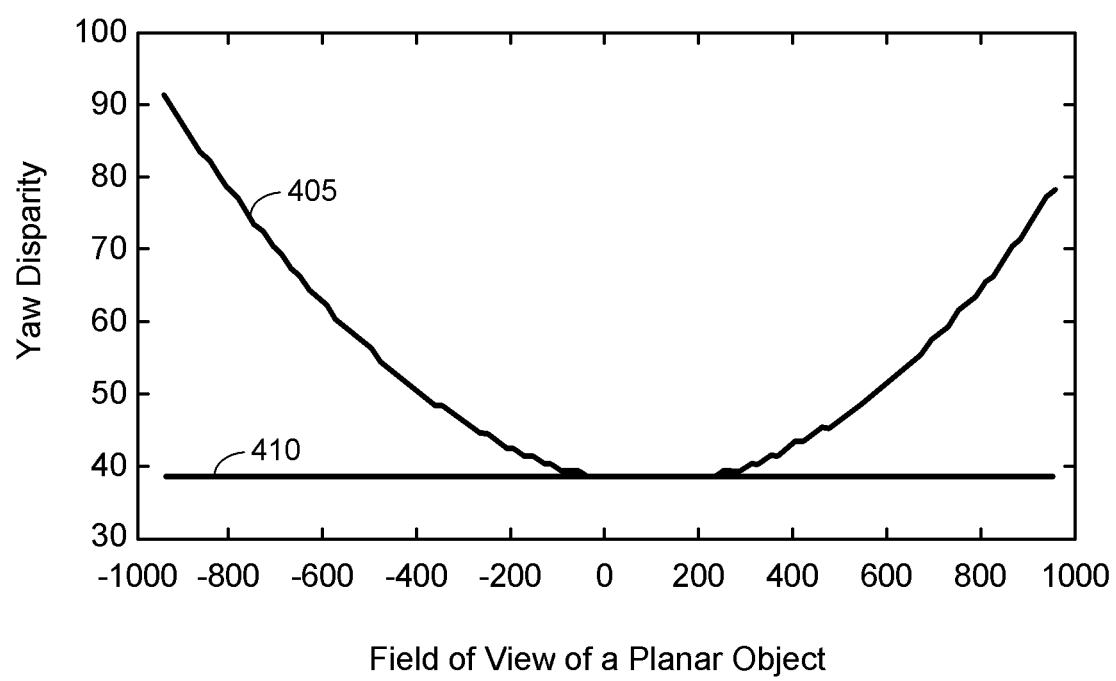
FIG. 4 illustrates a graph of a disparity drift due to yaw for a planar object viewed by stereoscopic imaging sensors at a fixed depth.

One example of a disparity drift due to yaw is shown graphically in FIG. 4. The x-axis of FIG. 4 illustrates a fraction of the field of view of the image sensors 105 and 110. The y-axis of FIG. 4 illustrates the yaw disparity angle A. When viewing a planar object with aligned image sensors 105 and 110, the planar object should appear as a single straight line, such as line 410. In other words, the disparity should be constant if the planar object is straight to the camera and the image sensor 105 and 110 are aligned. If there is some disparity angle A between image sensors 105 and 110, the planar object should appear as a curved line, such as line 405. The line 405 represents the disparity drift of a planar object at a fixed depth with the yaw angle equal to 11 degrees. The line 410 illustrates the expected constant disparity with no yaw angle difference between the two imaging sensors. A disparity drift between the image sensors may cause discomfort for a user viewing the images.

Figure 5:
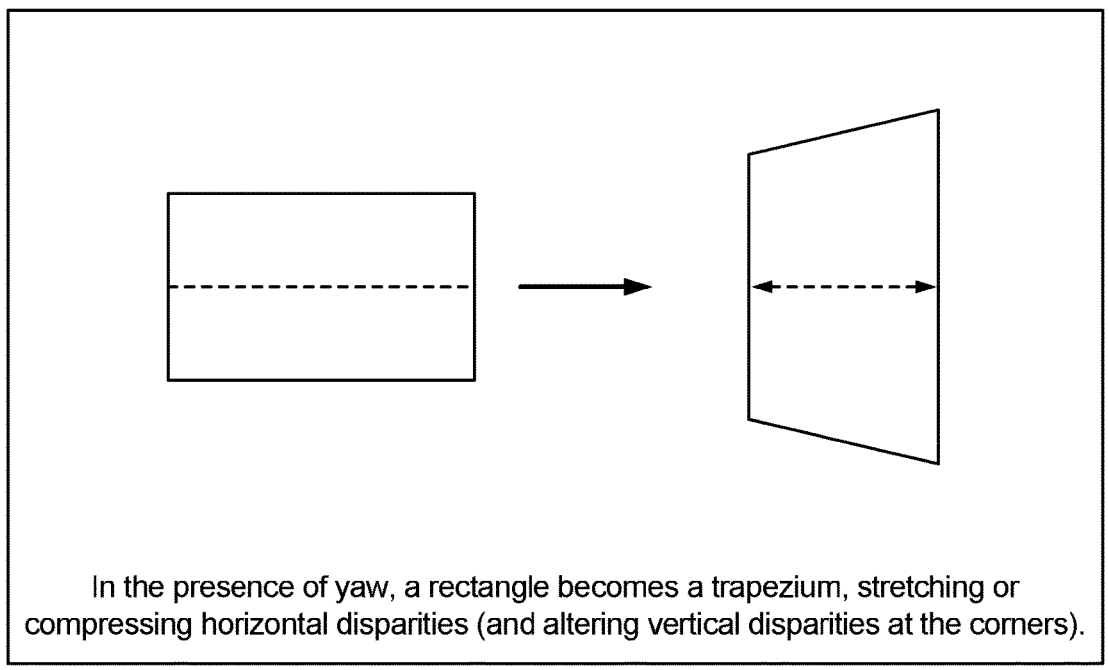
FIG. 5 illustrates the horizontal and vertical disparity of a rectangle viewed with stereoscopic imaging sensors misaligned in the yaw direction.

FIG. 5 illustrates the resulting stereoscopic image when a yaw disparity exists between two imaging sensors. In the presence of yaw angle disparity, a rectangle becomes a trapezium, stretching or compressing the horizontal disparities and altering vertical disparities at the corners.

After determining the disparity of the object between the images acquired by each sensor of the imaging sensor pair such as imaging sensors 105, 110, the process 300 transitions to block 312, wherein the stereo depth of the object is estimated using the disparity. In some embodiments, the stereo depth may be calculated as follows:

Depth_stereo=baseline*focal length/disparity, where baseline is the distance between the two imaging sensors of the stereoscopic imaging sensor pair.

Referring again to FIG. 3, after determining the stereo depth of the object, the process 300 transitions to block 314, wherein the processor 122 instructs the autofocus feature of the imaging device 150 to run to set an autofocus lens position of the imaging sensors 105, 110. The process 300 then transitions to block 316, wherein the processor 122 instructs the imaging device 150 to sweep through autofocus positions to determine a position (or setting) of one or more of the imaging sensors 105, 110 that produces, for example, the maximum high frequency map. The process 300 then transitions to block 318, wherein an autofocus "depth" of an object, as calculated by the autofocus feature, may be found using autofocus information (for example, statistic(s) calculated during the autofocus process).

Figure 6:
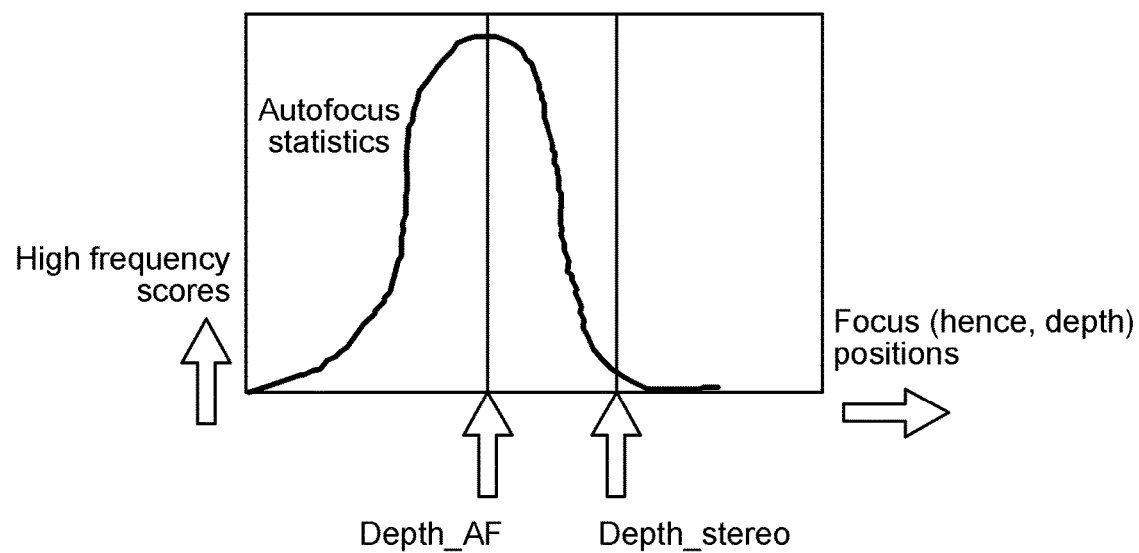
FIG. 6 graphically illustrates the difference between the autofocus depth position and the stereoscopic depth position for imaging sensors having yaw misalignment.

One example of the autofocus statistics is shown in FIG. 6. The focus position having the highest frequency autofocus scores, as indicated by the y-axis of the graph shown in FIG. 6, indicates the position where the image is the sharpest. To determine the autofocus depth position having the highest frequency scores, the autofocus function is directed to sweep over the different focus values. Using a sharpness detector, a sharpness of the image is indicated and the autofocus statistics will indicate at what autofocus position the image is sharpest. Based on the best autofocus position as indicated by the maximum number of high frequency scores, the equivalent "true" depth or autofocus depth (Depth_AF) of the object is found.

In the next block 320 of the process 300 illustrated in FIG. 3, the Depth_AF of the object is compared to the Depth_stereo of the object. If the two depths are not equal, then a yaw angle disparity is present and the process 300 transitions to block 322 wherein the yaw angle correction is estimated. The process 300 next transitions to block 324, wherein the image acquired by one sensor of the imaging sensors 105, 110 is projected or warped based on the estimated yaw angle difference between the two imaging sensors 105, 110 to correct for the yaw angle difference. The process 300 repeats beginning at block 310 by determining the disparity and estimating the depth of the object until the Depth_AF of the object as calculated by the autofocus statistics and the Depth_stereo of the object are equal. When the autofocus depth and the stereo depth of the object are equal, the yaw disparity has been corrected and the process 300 transitions to block 326 and ends.

In another embodiment that may be particularly useful for imaging devices having poor or low quality autofocus systems, the autofocus accuracy may drift with age. In some embodiments, the estimated depth measurement to an object in an imaged scene is more accurate using stereo depth estimation rather than autofocus depth estimations. In these embodiments, the stereo depth measurement may be used to correct the autofocus lens position of the imaging device 150. One embodiment of a process to correct autofocus lens position using estimated stereo depth measurements is shown in FIG. 7.

Figure 7:
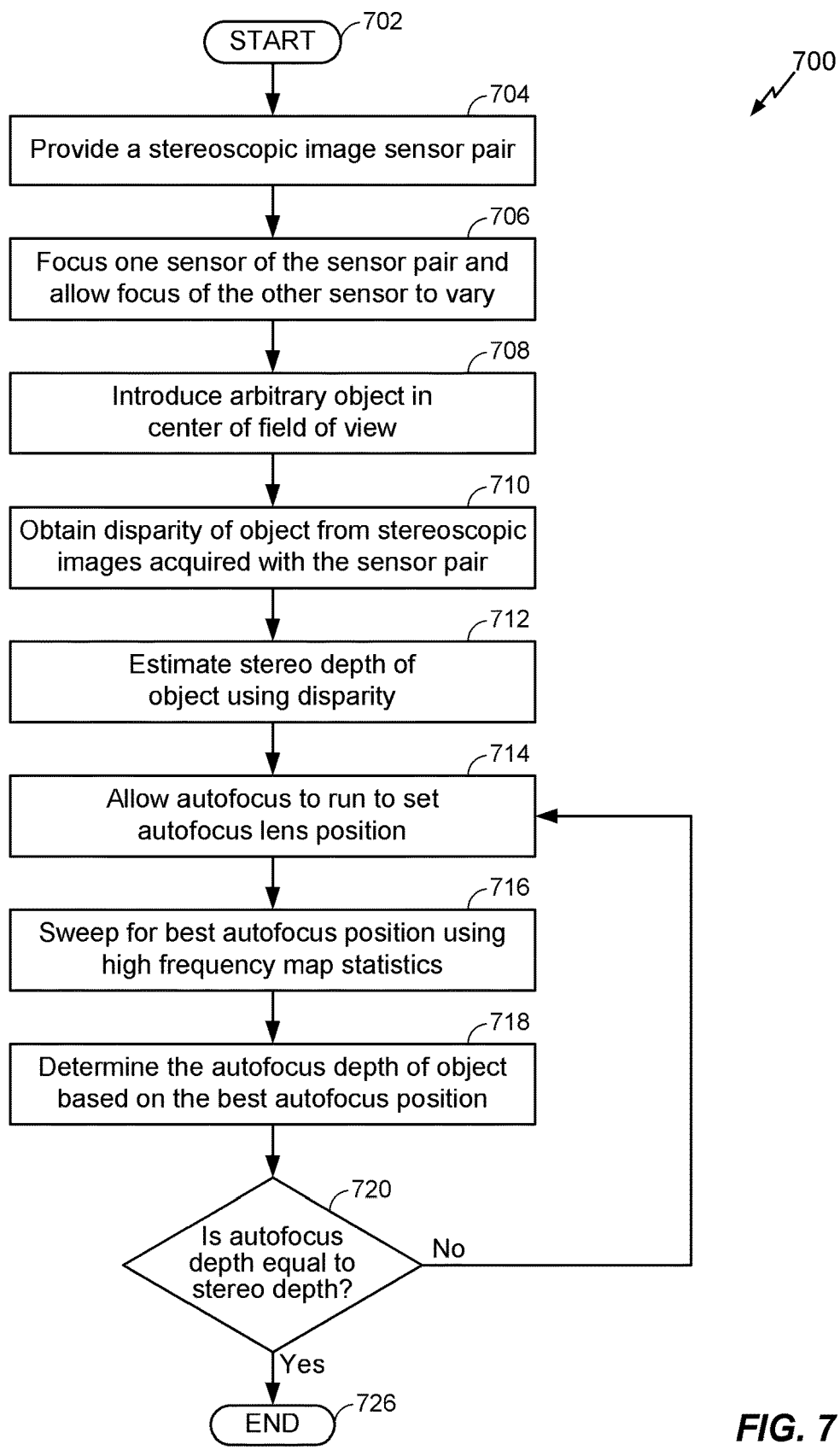
FIG. 7 is a flow chart depicting a high-level overview of a process to correct autofocus lens position of stereoscopic imaging sensors according to another embodiment.

FIG. 7 illustrates one embodiment of a process 700 to correct an autofocus lens position as that may be implemented in several modules depicted in FIG. 2. Process 700 may be used in some embodiments to estimate and correct an autofocus position of an imaging device with a low quality autofocus system having a stereoscopic imaging sensor pair. In some examples, the process 700 may be run on a processor, for example, processor 122 (FIG. 2), and on other components illustrated in FIG. 2 that are stored in memory 120 or that are incorporated in other hardware or software. The process 700 begins at start block 702 and transitions to block 704, wherein an imaging device such as imaging device 150 having an imaging sensor pair 105, 110 is provided. The process 700 then transitions to block 706, wherein the focus of one imaging sensor 105, 110 is fixed and the other imaging sensor focus is allowed to vary. The focus of either imaging sensor 105 or 110 could be fixed or moving. The process 700 then transitions to block 708, wherein an object is introduced in the center of the field of view of the imaging sensor 105, 110 with center focus enabled. The process 700 next transitions to block 710, wherein the disparity of the object is found from the image data acquired by the imaging sensor pair. In some embodiments, the disparity may be found by determining one or more keypoints of the object and matching the keypoint locations in the image data acquired by each sensor of the imaging sensor pair. Keypoints may be distinctive regions of an object that exhibit particularly unique characteristics. For example, regions that exhibit particular patterns or edges may be defined as keypoints. A keypoint match may include a pair of points, with one point identified in the first image and the second point identified in the second image.

After determining the disparity of the object between the image data acquired by each sensor of the imaging sensor pair, the process 700 transitions to block 712, wherein the stereo depth of the object is estimated using the disparity. In some embodiments, the stereo depth may be calculated as follows:

$$\text{Depth\_stereo} = \text{baseline} * \text{focal length} / \text{disparity},$$

where baseline is the distance between the two imaging sensors of the stereoscopic imaging sensor pair.

After determining the stereo depth of the object, the process 700 transitions to block 714, where the autofocus feature of the imaging device maybe activated to determine the autofocus lens position. The process 700 then transitions to block 716, wherein the imaging device may sweep through two or more autofocus positions of the imaging sensors to search for the best high frequency map. The process 700 then transitions to block 718, wherein an autofocus depth of an object, as calculated by the autofocus feature, may be found from the autofocus statistics. As discussed above, one example of the autofocus statistics is shown in FIG. 6. Based on the best autofocus position as indicated by the maximum number of high frequency scores, the equivalent "true" depth or Depth_AF of the object is found.

In the next block 720 of the process 700 shown in FIG. 7, the Depth_AF is compared to the Depth_stereo. If the two depths are not equal, the autofocus lens position may be corrected and the process 700 transitions to block 714 where the process 700 continues by setting a new autofocus position of the imaging sensors and the process 700 repeats until the Depth_AF of the object as calculated using the best autofocus position as determined by the autofocus statistics and the Depth_stereo of the object calculated from the disparity between the image data of the imaging sensors is equal. When the autofocus depth and the stereo depth are equal (or substantially equal), the process 700 transitions to block 726 and ends.

Clarifications Regarding Terminology

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for digitally correcting for a physical misalignment between a first imaging sensor and a second imaging sensor, comprising:
    at least one processor; and
    a memory having stored thereon instructions that, when executed, cause the at least one processor to:
        obtain a first image data of an object from the first imaging sensor;
        obtain a second image data of the object from the second imaging sensor;
        determine a stereoscopic distance to the object based upon a determined disparity of the object within the first image data and the second image data;
        determine an autofocus distance to the object based upon autofocus lens positions of the first imaging sensor and the second imaging sensor using a high frequency map;
        compare the stereoscopic distance and the autofocus distance to determine a misalignment difference; and
        correct for the physical misalignment between the first imaging sensor and the second imaging sensor based upon the determined misalignment difference.

2. The system of claim 1, the memory further having stored thereon instructions that, when executed, cause the processor to determine the disparity of the object by comparing the first image data and the second image data.

3. The system of claim 1, the memory further having stored thereon instructions that, when executed, cause the processor to determine the stereoscopic distance using the first image data and the second image data based on comparing keypoints of the object located in both the first image data and the second image data.

4. The system of claim 1, the memory further having stored thereon instructions that, when executed, cause the processor to perform autofocus functions to determine and set the autofocus lens positions of the first imaging sensor and the second imaging sensor.

5. The system of claim 1, the memory further having stored thereon instructions that, when executed, cause the processor to warp one of the first image data and the second image data to reduce the disparity of the object if a difference between the stereoscopic distance and the autofocus distance is not zero.

6. A method for digitally correcting for a physical misalignment between a first imaging sensor and a second imaging sensor using autofocus feedback, comprising:
    obtaining a first image data of an object from the first imaging sensor;
    obtaining a second image data of the object from the second imaging sensor;
    determining a stereoscopic distance to the object based upon a determined disparity of the object within the first image data and the second image data;
    determining an autofocus distance to the object based upon autofocus lens positions of the first imaging sensor and the second imaging sensor using a high frequency map;
    comparing the stereoscopic distance and the autofocus distance to determine a misalignment difference; and
    correcting for the physical misalignment between the first imaging sensor and the second imaging sensor based upon the determined misalignment difference.

7. The method of claim 6, further comprising determining the disparity of the object by comparing the first image data and the second image data.

8. The method of claim 6, wherein determining the stereoscopic distance to the object using the first image data and the second image data comprises comparing keypoints of the object located in both the first image data and the second image data.

9. The method of claim 6, further comprising performing autofocus functions to determine and set the autofocus lens positions of the first imaging sensor and the second imaging sensor.

10. The method of claim 6, further comprising warping one of the first image data and the second image data to reduce the disparity of the object if a difference between the stereoscopic distance and the autofocus distance is not zero.

11. A method for correcting for an autofocus lens position of an imaging device having a first imaging sensor and a second imaging sensor using autofocus feedback, comprising:
    obtaining a first image data of an object from the first imaging sensor;
    obtaining a second image data of the object from the second imaging sensor;
    determining a stereoscopic distance to the object based upon a determined disparity of the object within the first image data and the second image data;

determining an autofocus distance to the object based upon autofocus lens positions of the first imaging sensor and the second imaging sensor using a high frequency map;

comparing the stereoscopic distance and the autofocus distance to determine an autofocus correction; and correcting for the autofocus lens position of the imaging device based upon the determined autofocus correction.

12. The method of claim 11, wherein determining the stereoscopic distance to the object further comprises determining the disparity of the object by comparing the first image data and the second image data.

13. The method of claim 11, wherein determining the autofocus distance comprises performing autofocus functions on the object to determine and set the autofocus lens positions of the first imaging sensor and the second imaging sensor.

14. The method of claim 11, wherein correcting for the autofocus lens position of the imaging device further comprises correcting for a distance estimate of the autofocus lens position of the imaging device if a difference between the autofocus distance and the stereoscopic distance is not zero.

15. An apparatus for correcting for an autofocus lens position of an imaging device and correcting for a physical misalignment between a first imaging sensor and a second imaging sensor using autofocus feedback, comprising:

means for obtaining a first image data of an object from the first imaging sensor;

means for obtaining a second image data of the object from the second imaging sensor;

means for determining a stereoscopic distance to the object using the first image data and the second image data by determining a disparity of the object from the first image data and the second image data;

means for determining an autofocus distance to the object using the autofocus lens position of the imaging device by performing autofocus functions on the object to determine and set autofocus lens positions of the first imaging sensor and the second imaging sensor using a high frequency map;

means for comparing the stereoscopic distance and the autofocus distance to determine an autofocus correction; and means for correcting for the autofocus lens position of the imaging device based upon the determined autofocus correction if a difference between the autofocus distance and the stereoscopic distance is not zero.

16. The apparatus of claim 15, further comprising means for determining the disparity of the object by comparing the first image data and the second image data.

17. The apparatus of claim 15, further comprising means for performing autofocus functions to determine and set the autofocus lens positions of the first imaging sensor and the second imaging sensor.

18. The apparatus of claim 15, further comprising means for warping one of the first image data and the second image data to reduce the disparity of the object if a difference between the stereoscopic depth and the autofocus depth is not zero.

19. The apparatus of claim 15, further comprising means for correcting for the physical misalignment between the first imaging sensor and the second imaging sensor using a difference between the stereoscopic distance and the autofocus distance.

20. A non-transitory computer-readable medium storing instructions that, when executed, cause at least one physical computer processor to perform a method of digitally correcting for a physical misalignment between a first imaging sensor and a second imaging sensor using autofocus feedback, the method comprising:

obtaining a first image data of an object from the first imaging sensor;

obtaining a second image data of the object from the second imaging sensor;

determining a stereoscopic distance to the object based upon a determined disparity of the object within the first image data and the second image data;

determining an autofocus distance to the object based upon autofocus lens positions of the first imaging sensor and the second imaging sensor;

comparing the stereoscopic distance and the autofocus distance to determine a misalignment difference; and correcting for the physical misalignment between the first imaging sensor and the second imaging sensor based upon the determined misalignment difference.

21. The non-transitory computer-readable medium of claim 20, further comprising determining the disparity of the object by comparing the first image data and the second image data.

22. The non-transitory computer-readable medium of claim 20, wherein determining the stereoscopic distance comprises comparing keypoints of the object located in both the first image data and the second image data.

23. The non-transitory computer-readable medium of claim 20, further comprising performing autofocus functions to determine and set the autofocus lens positions of the first imaging sensor and the second imaging sensor.

24. The non-transitory computer-readable medium of claim 20, further comprising warping one of the first image data and the second image data to reduce the disparity of the object if a difference between the stereoscopic distance and the autofocus distance is not zero.

* * * * *